(12) United States Patent
Compton et al.

(10) Patent No.: US 12,252,890 B2
(45) Date of Patent: Mar. 18, 2025

(54) ROBOTIC PLATFORM FOR CONSTRUCTION

(71) Applicant: Gannett Peak Partners LLC, Spring, TX (US)

(72) Inventors: James Eric Compton, Highlands Ranch, CO (US); Chris Gilman, Highlands Ranch, CO (US); Casey Roberts, Spring, TX (US)

(73) Assignee: Gannett Peak Partners LLC, Spring, TX (US)

( * ) Notice: Subject to any disclaimer, the term of this patent is extended or adjusted under 35 U.S.C. 154(b) by 0 days.

(21) Appl. No.: 18/225,333

(22) Filed: Jul. 24, 2023

(65) Prior Publication Data

US 2024/0035293 A1 Feb. 1, 2024

Related U.S. Application Data

(63) Continuation of application No. 17/600,989, filed on Oct. 1, 2021, now abandoned.

(51) Int. Cl.
*B33Y 50/02* (2015.01)
*B29C 64/209* (2017.01)
*B29C 64/393* (2017.01)
*B33Y 30/00* (2015.01)
*B33Y 80/00* (2015.01)
*E04G 21/04* (2006.01)
*F15B 15/20* (2006.01)
*G05B 19/19* (2006.01)
*B29L 31/00* (2006.01)

(52) U.S. Cl.
CPC ........ *E04G 21/0463* (2013.01); *B29C 64/209* (2017.08); *B29C 64/393* (2017.08); *B33Y 30/00* (2014.12); *B33Y 50/02* (2014.12); *B33Y 80/00* (2014.12); *F15B 15/20* (2013.01); *G05B 19/19* (2013.01); *B29L 2031/776* (2013.01); *F15B 2211/6656* (2013.01); *G05B 2219/39001* (2013.01); *G05B 2219/49023* (2013.01)

(58) Field of Classification Search
CPC . E04G 21/0463; B29C 64/209; B29C 64/393; B33Y 30/00; B33Y 50/02; B33Y 80/00; F15B 15/20; F15B 2211/6656; G05B 19/19; G05B 2219/39001; G05B 2219/49023; B29L 2031/776
See application file for complete search history.

(56) References Cited

U.S. PATENT DOCUMENTS

2016/0076263 A1* 3/2016 Tebeek ................. B66C 13/066
 701/50
2018/0162011 A1* 6/2018 Friend ..................... E02F 9/205

* cited by examiner

*Primary Examiner* — Yuhui R Pan
(74) *Attorney, Agent, or Firm* — Quisenberry Law PLLC

(57) ABSTRACT

System for constructing a building implementing a controller. The system includes a first control arm and a second control arm. The system also includes an extrusion head located on a distal end of the second control arm. The controller is operable to adjust the first control arm to hold a distal end stead within a predetermined window of coordinates. The controller is also operable to position the second control arm such that the extrusion head is located according to the controller directions.

7 Claims, 12 Drawing Sheets

ROBOTIC PLATFORM FOR CONSTRUCTION

CROSS-REFERENCE TO RELATED APPLICATIONS

This application is a continuation of U.S. non-provisional patent application Ser. No. 17/600,989, filed Oct. 1, 2021, which is the National Stage patent application of PCT International Patent Application No. PCT/US2021/033025, filed under 35 U.S.C. § 371 on May 18, 2021, which claims the benefit of U.S. Provisional Application No. 63/026,551, filed May 18, 2020, the entire contents of which are incorporated herein by reference.

FIELD

The present disclosure relates generally to systems and methods for building structures.

BACKGROUND

Traditionally all structures built are built with conventional building practices and materials. This involves cutting material either in advance or on the job site to fit the desired structure. In other examples, brick laying or construction from concrete masonry units can be deployed. The building process requires plans and people to interpret the plans to build the building.

BRIEF DESCRIPTION OF THE DRAWINGS

Implementations of the present technology will now be described, by way of example only, with reference to the attached figures, wherein.

DETAILED DESCRIPTION

Figure 1:
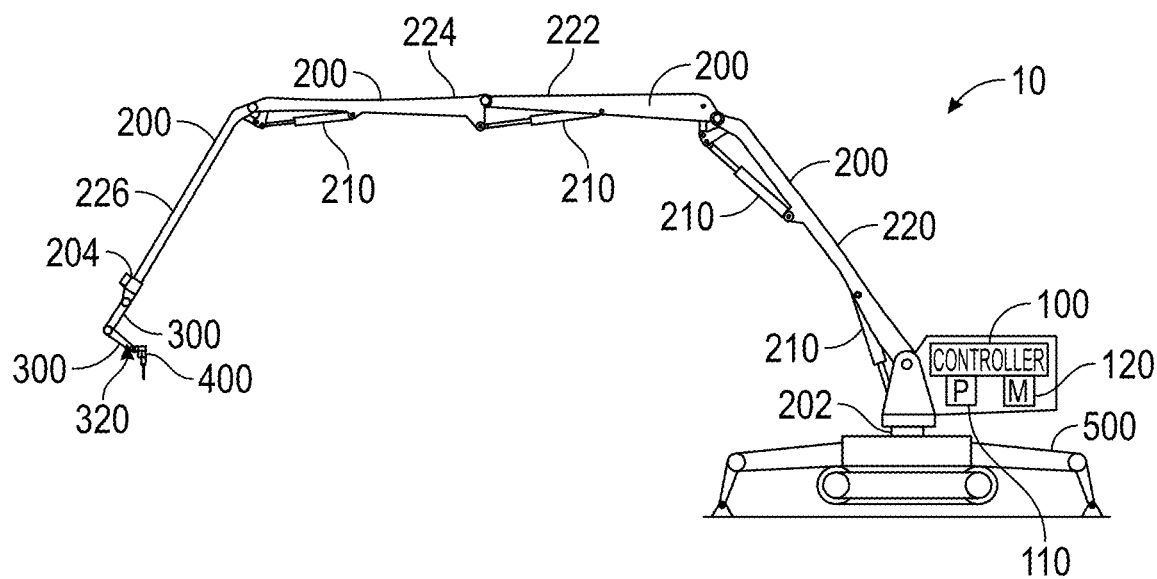
FIG. 1 is an example of a unit designed according to the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "comprising," "including" and "having" are used interchangeably in this disclosure. The terms "comprising," "including" and "having" mean to include, but not necessarily be limited to the things so described.

Disclosed herein are systems, methods, and computer-readable media for anonymously obtaining distance information for different devices.

Due to the danger, logistics, and complexity of expeditionary construction during military operations, 3D printing and onsite construction is one of the benefits offered by the present disclosure. As described herein, a deployable large-scale robotic Additive Manufacturing (AM) platform capable of leveraging novel materials will speed up the construction process, while keeping personnel safe including in at least one example military personnel.

Additionally, the present disclosure can be implemented to build structures in standard settings such as making houses or commercial buildings. The structures are generally described herein as buildings, but can be any structure that is designed to be on the scale of a small building or tank. The present disclosure can be implemented to build both exterior structures as well as interior structures. The apparatus described herein can be scaled according to the desired building size. The example provided herein is for building a moderate size structure on the order of a typical house. The present disclosure contemplates implementing multiple machines to build a structure as well. In other examples, the present disclosure can be used to build other structures such as tanks, storage units, to apply internal/external coatings, pick/place objects around a given site, to backfill concrete or other materials in a given cavity by traditional construction methods.

Typical hollow form structures fitting within the building can be constructed in as little as 4 hours. The present disclosure can implement an extrusion device head to produce the structure. The system includes a first control arm and a second control arm coupled to the first control arm. An extrusion head is located on a distal end of the second control arm. The extrusion head is operable to extrude material to form a structure such as a building or tank. The material that is used by the extrusion head can be adjusted depending on the structure being made. In one example, an elastomeric thermoset polymer can be implemented. In other examples, concrete, geopolymers, thermoplastics, and other traditional construction materials can be extruded as well.

The present technology this project is centered on the realization of a large-scale first control arm. In one example, the first control arm can be a single arm robotic manipulator capable of precise motion control. A single arm manipulator is constructed similar to an industrial robot—but much larger in size. The manipulator can be based on hardware typically found in the concrete industry for placement of concrete on the jobsite. In one example, the present system is designed as requiring two people to run and operate it. One will operate and monitor the machine, while the other will resupply the print/construction material as needed. In one example, the system can be capable of loading and unloading out of a standard 20 foot container. In other examples, the system can be much larger and be mounted to a vehicle that is larger than 20 feet. The system can include process lines and equipment to support the 3D printing process. Hydraulic components can be implemented to facilitate autonomous operation as well as provide feedback of arm location in space. Finally, the second arm can be an end effector attached to the first arm to provide micro-level manipulation and capability to the system. This can facilitate a far more extensive build volume, as well as providing a mobile machine that can be driven to the build site, quickly set up, and localized to the build environment to begin work.

The extrusion of the material requires more than following the programmed path. In typical robotic dispensing applications, the key to success is maintaining a constant linear speed matching the dispensing flow rate. The net result of this requirement is that the joint motion of the robotic platform must speed up and slow down as the print head moves around curves and features in the programmed toolpath. The mathematics involved in calculating the required end effector motion to accurately maintain a matching linear speed to the material deposition nozzle have been programmed into the controller.

Figure 4:
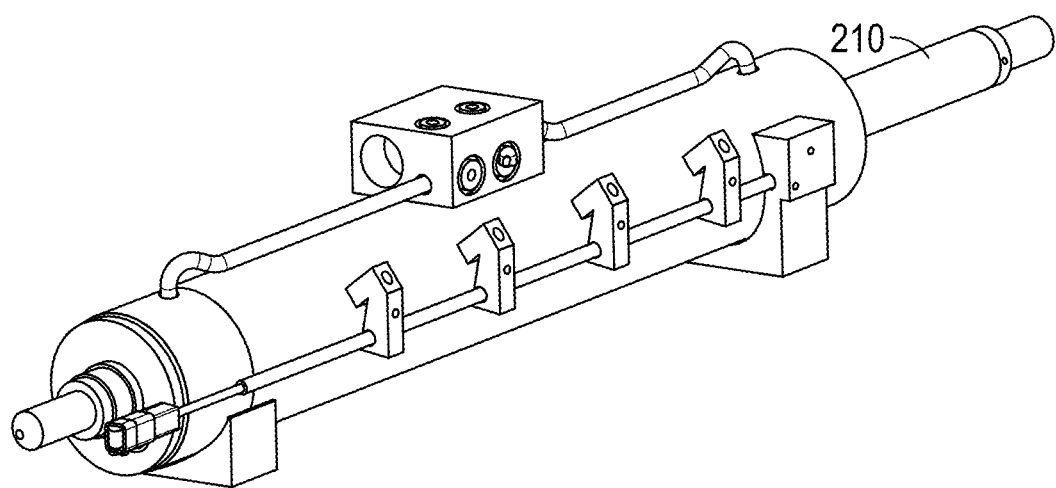
FIG. 4 is a hydraulic feedback positioner.

An example of a system is illustrated in FIG. 1. The system 10 includes a controller 100 having one or more processors 110 and a memory 120. The system 10 includes a first control arm 200. The first control arm 200 can include one or more hydraulic joints 210. In other examples, the one or more hydraulic joints 210 can be replaced by electromechanical joints 210. In other examples, the joints 210 can be a combination of a hydraulic joints and electromechanical joints. In still other examples, the joints 210 can be such that some joints are hydraulic joints and others are electromechanical joints. While the present disclosure generally discusses hydraulic joints, the disclosure covers the combination as presented in the present paragraph. The first control arm 200 can include a plurality of members 220, 222, 224, 226. While the first control arm 200 is illustrated as having four members 220, 222, 224, 226, the first control arm 200 can include just two members or more than four members. The one or more joints 210 are operable to receive instructions from the controller 100. In at least one example, the instructions can be sent via a wired connection between the controller 100 and the one or more joints 210. In other examples, the instructions can be sent via wireless connections between the controller 100 and the one or more joints 210. In at least one example, at least one of the one or more joints 210 can be operable to include a positional feedback system that provides data to the controller 100. In at least one example, each of the one or more joints 210 can include a positional feedback system. In at least one example, the joint 210 includes an associated hydraulic cylinder and the hydraulic cylinder includes the positional feedback system. An example of a hydraulic cylinder that includes the positional feedback system is illustrated in FIG. 4. In another example, joint 210 includes a motor driven electromechanical cylinder and the cylinder includes the positional feedback system as well.

Figure 14:
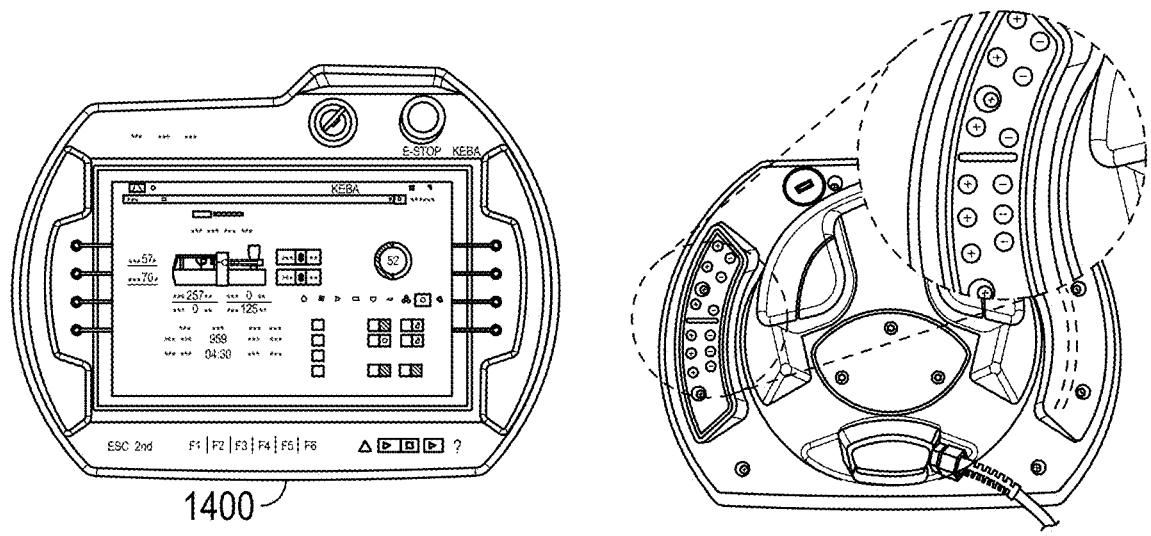
FIG. 14 illustrates an example of a ruggedized handheld pendant.

The first control arm, at a proximal end 202, can be coupled to a base 500. As illustrated, the one or more joints 210 are located between the proximal end 202 and the distal end 204 of the first control arm 200. The distal end 204 of the first control arm 200 can be operable to receive a second control arm 300. The second control arm 300 can include two or more joints. The second control arm 300 can have a distal end 320 that is operable to receive an extrusion head 400. The position of the distal end 320 is adjusted by the controller 100. In at least one example, the controller 100 can receive instructions for movement of the distal end 320 of the second control arm 300. The controller 100 can adjust the first control arm 200 to hold the distal end 204 steady within a predetermined window of coordinates. As the second control arms moves to implement the programed toolpath, the large arm moves with coordinated motion to maintain the second control arm within its accepted range of motion. The controller 100 is operable to adjust the distal end 320 of the second control arm 300 such that the extrusion head 400 is located according to the controller directions. In one example, the controller 100 can receive instructions wirelessly. In another example, the controller 100 can receive instructions over a wire. The controller 100 can receive instructions from a remote computer or a handheld pendant 1400 as illustrated in FIG. 14. The handheld pendant 1400 can be operable to be coupled wirelessly or via a wired connection to a computer or a cloud device.

In one example, the first control arm 200 can have a total reach at least ten times greater than the second control arm 300. In another example, the first control arm 200 can have a total reach at least five times greater than the second control arm 300. In another example the first control arm 200 can have a total reach at least three times greater than the second control arm 300.

Figure 2:
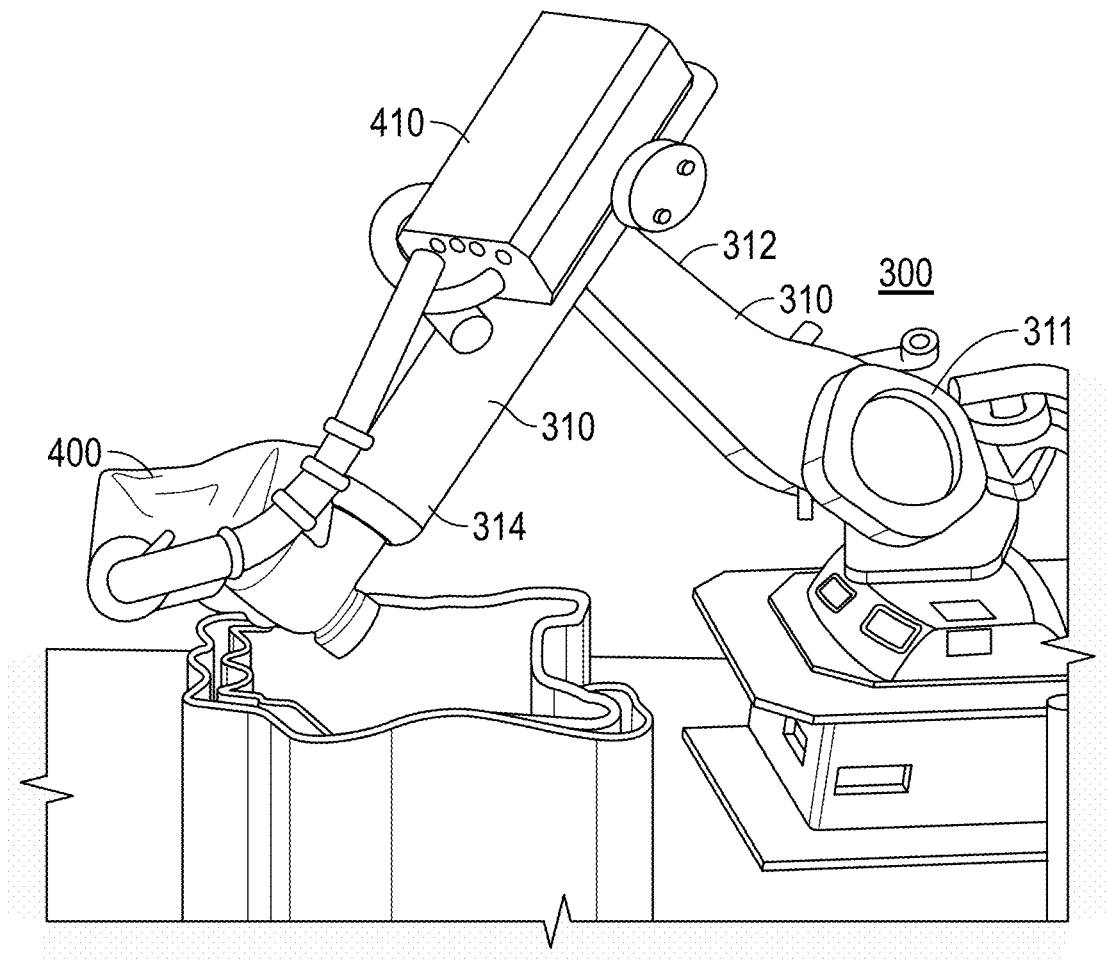
FIG. 2 is an example of an end arm robot according to the present disclosure.

FIG. 2 illustrates an example of the second control arm 300 separated from the first control arm 200. The second control arm 300 can include a plurality of segments 310. As illustrated the first segment 312 is coupled to a base 311. The second segment 314 is coupled to the first segment. The extrusion head 400 can be coupled to the second segment 314. The extrusion head 400 can be coupled to additional components such as an extrusion processing controller 410 that controls the flow of material to the extrusion head 400. The extrusion head 400 can take a variety of forms such as a hose delivering premixed material, a static mixer, a dynamic mixer, and/or an acoustic mixer.

Figure 3A:
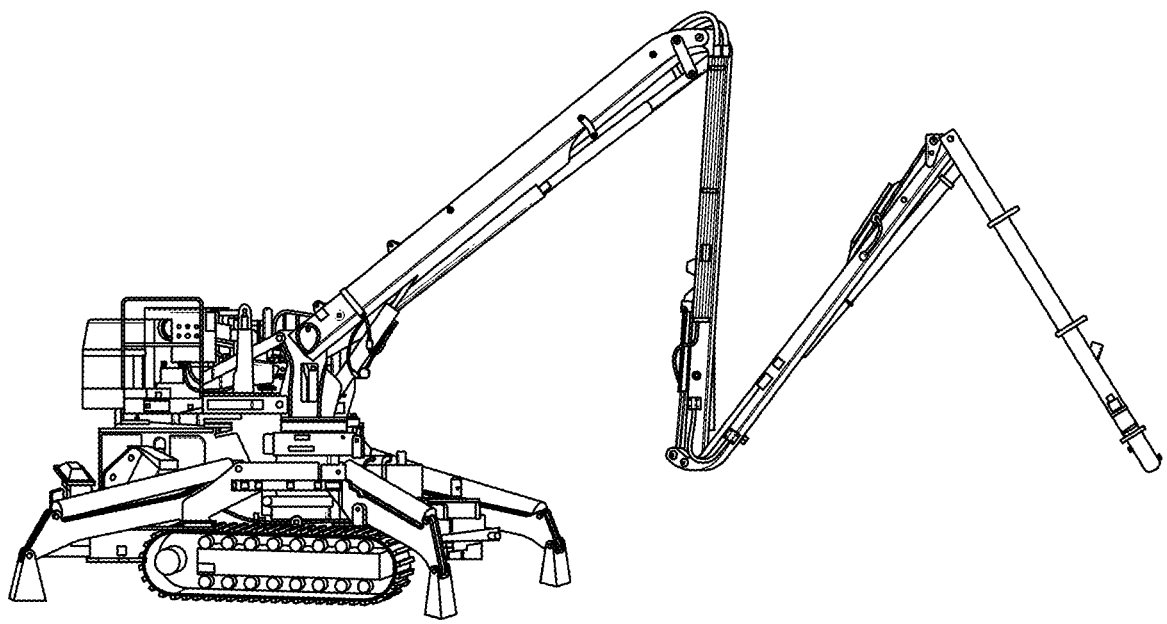
FIG. 3A is an example of a crawling platform.
Figure 3B:
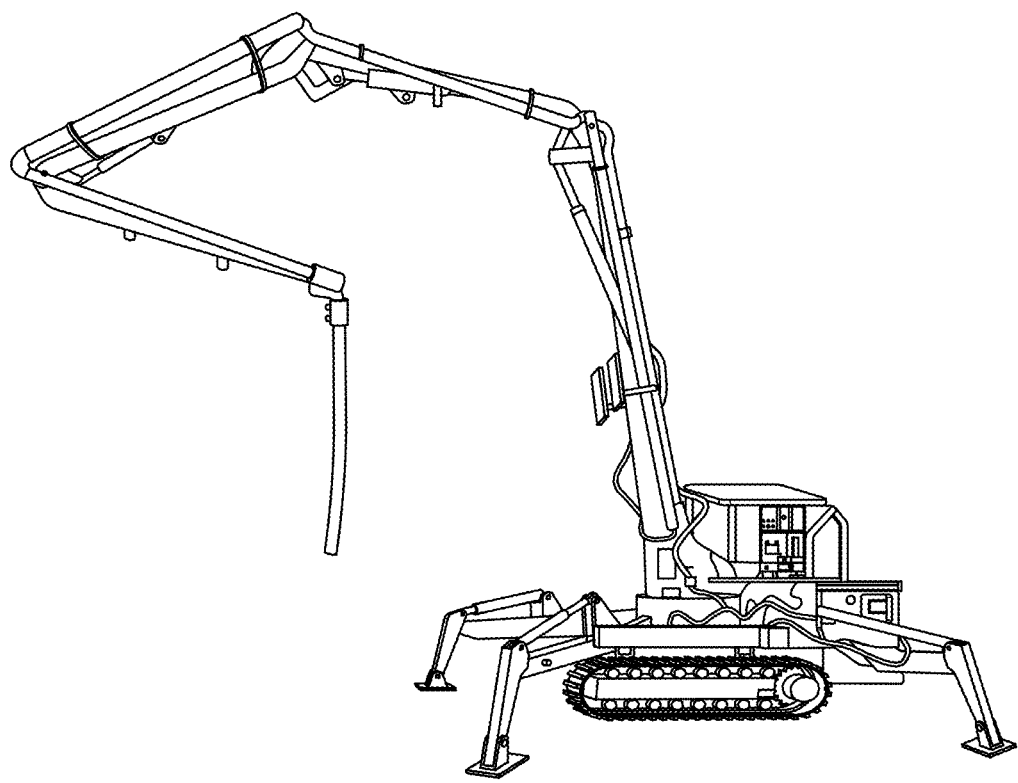
FIG. 3B is another example of a crawling platform.

According to one example, the described device can use components from crawling concrete placement booms. These are illustrated in FIGS. 3A and 3B, where FIG. 3A is a 16Z4 and 3B is a Royal Makine HCS16 ZR4. Both have a reach of 16 m (52.5'). This reach can allow for a large printing window that can accommodate most normal structures and designs. They can be procured with diesel, gas, or electric power. In at least one example a fueled engine is preferred so that the machine can load/unload under its own power without having to be tethered to a generator. In alternate embodiments the device can be built smaller to allow the system to fit through a typical building man-door and allow construction within the interior of a new or existing structure.

Large-scale motion is enabled using a crawling concrete placement boom. The machine is designed with a hydraulic supply unit that provides motivation power as well as muscle power to articulate the joints of the machine. According to the present disclosure, the valves are automated control via an electric signal. An example of the control of the valves is further illustrated in FIG. 16.

Large-scale motion can also be enabled with the use of electromechanical joints for position. In this embodiment, the machine is designed with an internal or external large power generation unit to provide electricity to drive the motors and articulate the joints of the machine.

In one example, the machine is designed to be utilized in a rough, expeditionary environment. The machines are built with heavy duty tracks to enable movement on all kinds of surfaces found on typical construction sites. This can also allow the machine to move on any kind of surface in an expeditionary environment be it hard packed or loose sand. The included outriggers are designed to support the full weight of the machine and can be used to completely level the machine for operation in uneven terrain. In other examples, the machine can be designed for use in residential areas.

The boom is designed to transport heavy payloads over the full horizontally extended length of the boom. The rigid, base structure can allow for material dispensing of polymer as well as any number of heavier materials, such as concrete. The strength and rigidity of the boom can also support the addition of second control arm, such as a micromanipulator of FIG. 2, at the end of the boom to control fine motion of the completed printing assembly and prevent the whole assembly from drooping or causing positional issues due to beam/arm flexure or sagging.

The crawler is further configured to include smart feedback and control actuators. An example is illustrated in FIG. 4. These actuators contain integral linear position feedback sensors that can provide the exact location of each actuator linkage. These actuators are capable of providing 0.6 mm accuracy and 0.08 mm repeatability on a 60" stroke cylinder. The built-in control solenoids also reduce circuit hydraulic line length to shorten response time and circuit "sponginess" that leads to bouncing and harmonic residence in the controlled joints.

In the electromechanical example, the actuators contain integral encoders to measure rotations of the electric motor driving the cylinder. From this data, linear position is calculated to provide exact location of each actuator linkage. These cylinders are also capable of providing precise accuracy and high repeatability.

Figure 5:
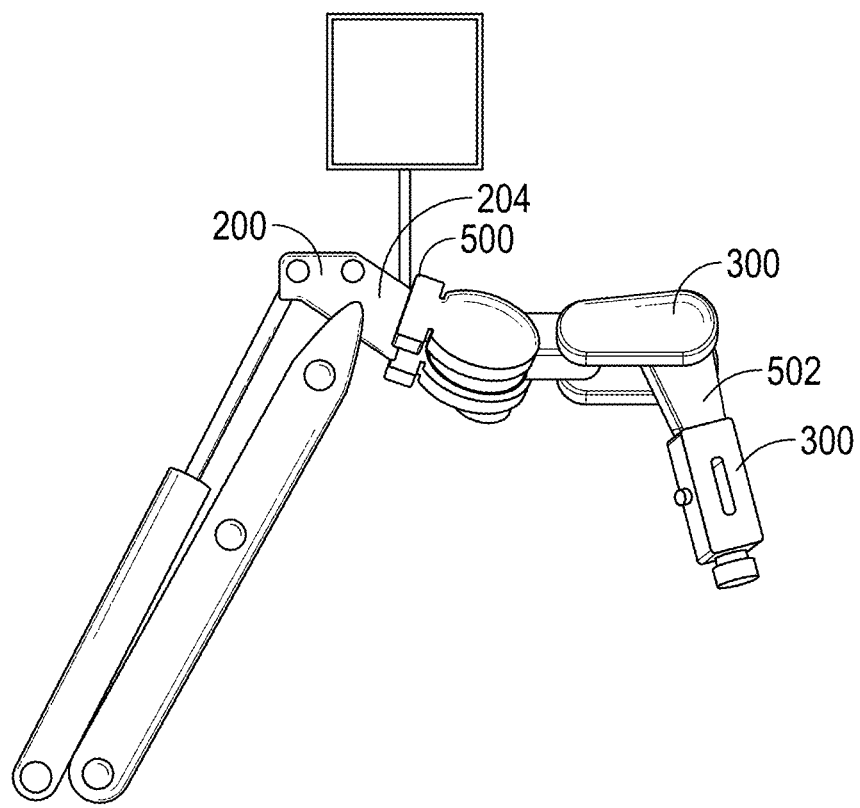
FIG. 5 is a diagrammatic example of an end arm robot attached to a boom arm of a crawler according to the present disclosure.

As illustrated in FIG. 5, a mounting plate 500 can be designed to add a micromanipulator 502 to the distal end 204 of the first control arm 200. The micromanipulator includes a second control arm 300. This micromanipulator 502 can be an industrial robot that can provide fine motion control on the distal end 204 of the first control arm 200. Using this motion architecture, the first control arm 200 can maintain the gross path over the desired toolpath using smooth calculated motion. The second control arm 300 can provide precise positioning over the toolpath while accommodating the speed and direction changes necessary to maintain a constant linear velocity during extrusion. This enables the micromanipulator 502 to assist with motion correction that is needed due to harmonics, vibration, wind, and any other external elements.

Figure 6:
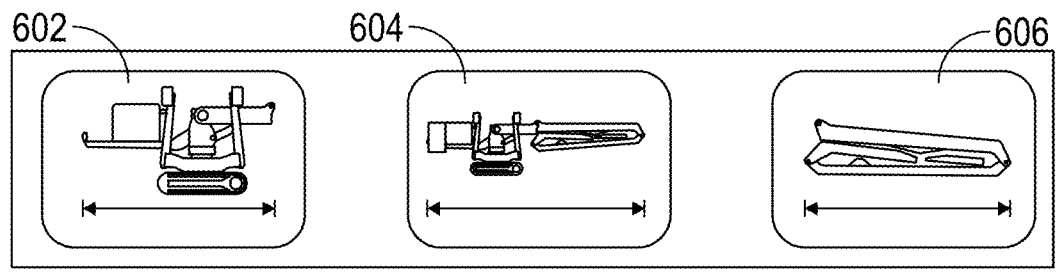
FIG. 6 is a diagrammatic example of relative sizes of components according to the present disclosure.

The crawlers can have the main boom removed for shipment. This can allow the powered crawler unit to place/remove the main boom into one 20' shipping container in a purpose-built rack. Then, the operator can drive the base crawling unit into another 20' shipping container and secure both. This can allow the full printing unit along with necessary tooling and maintenance equipment to be transported in a pair of 20' shipping containers that can fit onto one transport vehicle. FIG. 6 illustrates relative sizes of the different components of the system in different configurations. The base 602 can have a first length of X. When the boom is attached to the base, the assembled system 604 can have a length of 2X. When the boom is separated, the boom can have a length of X. In at least one example, X can be such that it fits within the desired shipping container.

With the design, integration, and assembly of these commonly available components we will be able to create a large-scale platform that is highly accurate that can perform the construction tasks.

The large-scale 3D printing system is designed so that multiple materials could be used. In one example, the material used is a plural component thermoset polymer. The polymer enables the construction of any number of hollow form as well as solid-fill objects. The hollow form objects provide formwork so that they can be filled with other standard and especially indigenous materials such as sand, gravel, or dirt. In another example, the material used is a cementitious or geopolymer mortar.

Figure 7:
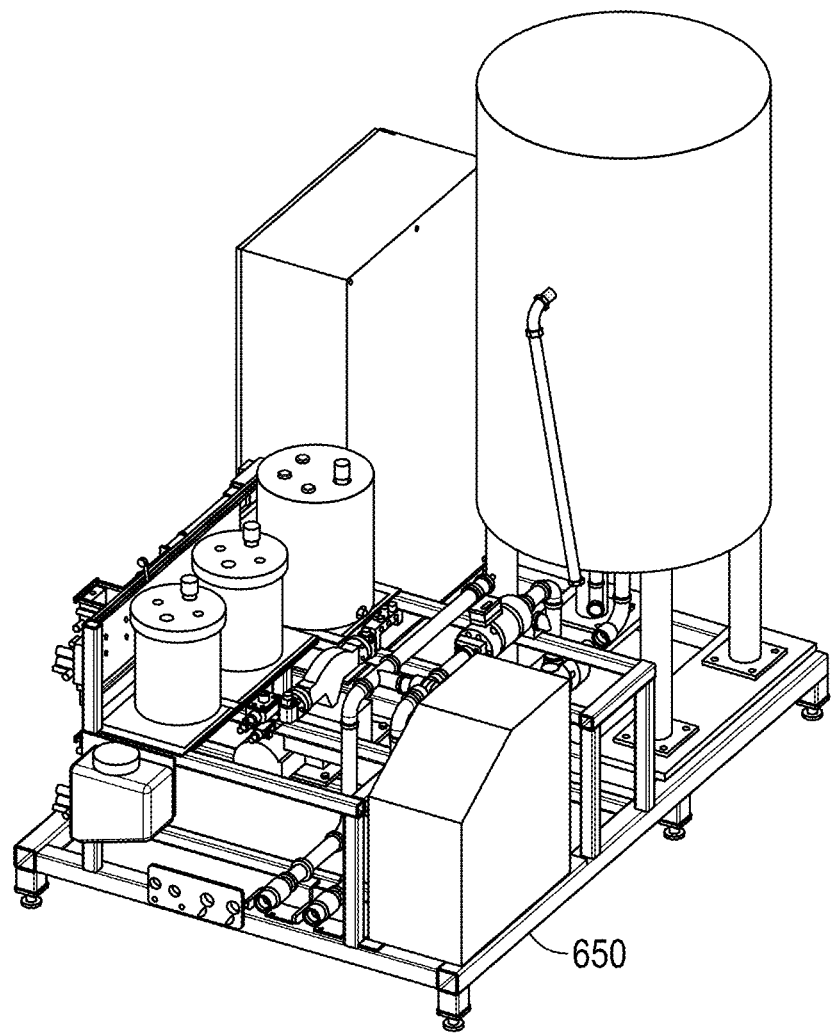
FIG. 7 is a material delivery system according to the present disclosure.

FIG. 7 illustrates an example of a skid 650 for material delivery. The skid 650 for material delivery can be designed to fit onto the back of the base of the crawler instead of or in conjunction with ballast weights so that the machine can be prevented from tipping over while extended.

The current material delivery system can have material storage for roughly one hour of operation at maximum flow rates. Pump and tank sizing can be adjusted to match expected robot linear motion rates while extruding the correct volume of material. The skid 650 can easily be mounted/unmounted on the back of the crawler unit should maintenance need to be performed.

Figure 8:
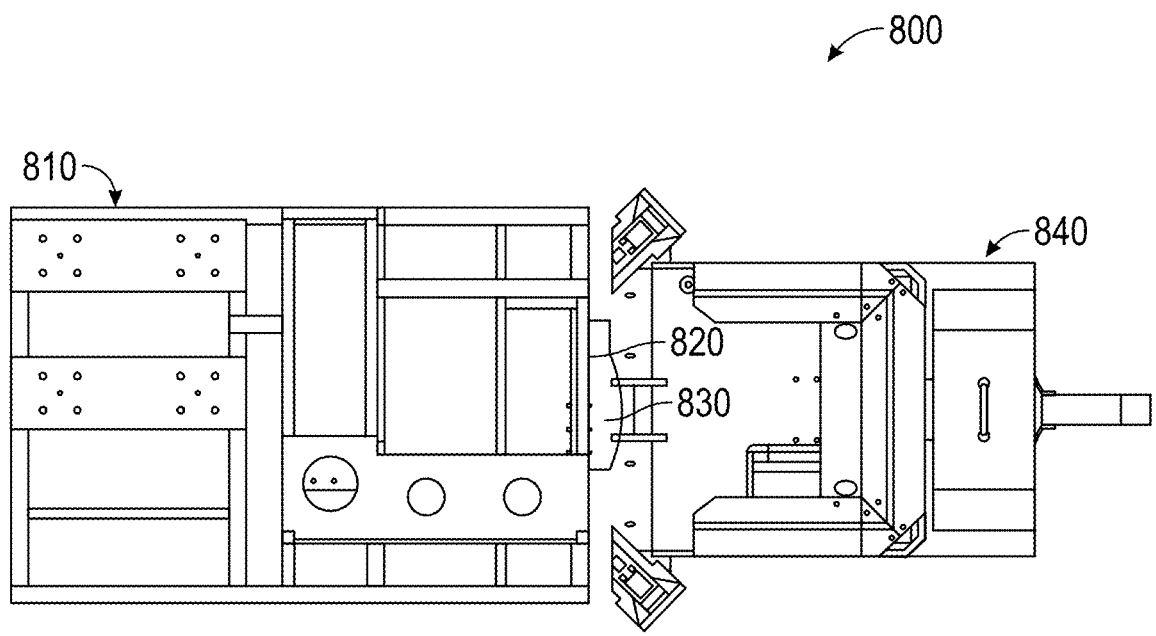
FIG. 8 illustrate the processing skid and robot frame structure.

FIG. 8 illustrates a system 800 including a material delivery skid 810 that can be mounted to the base crawler units 840. The material delivery skid 810 can be a frame. The material delivery skid 810 can include tanks, pumps, and/or instrumentation. The system 800 can include a mechanical connection 820 to the crawler structure 840 that couples the material delivery skid 810 to the crawler structure 840. Additionally, the system can include a chemical and electrical junction 830 to transfer power and material between the material delivery skid 810 and the crawler structure 840.

The thermoset polymer, thermoplastic, cementitious mortar, or geopolymer can be a single or plural component material used for the printing of structures. Both the cure time and final density may be changed by the final mixer in the material delivery system. The cure time can be as little as a few seconds for printing applications or a much as a few hours or days for coating or pouring applications. These characteristics allow the final construction design to be optimized for strength where necessary while saving material in areas where the additional strength is not needed.

The control of the robotic system can be established with a collection of core software components: an inertial measurement system, a robust kinematic model, and a high-level motion planning infrastructure.

| System Software Architecture | | |
| --- | --- | --- |
| | Robot program | |
| | Path Planning System | |
| | Kinematic Model | |
| Inertial Sensor | Low-level controls | Robot controller: |
| System | system: primary arm | secondary arm |

The primary sensor for corrective feedback on the arm is an integrated inertial/gyroscopic measurement unit. This detects unpredictable movements present at the end of the control arm that cannot accounted for in the kinematic model such as weather effects. This is achieved by constantly measuring the motion of the control arm of the robotic platform. Once the instantaneous motion is captured, this value is filtered to reduce noise and then the programmed motion of the control arm is subtracted. The resulting motion vector is the unwanted or additional noise in the control arm caused by external factors as well as mechanical system harmonics, etc. This enables an additional motion vector to be added to the micromanipulator in real-time to cancel out the unwanted motion and maintain the correct tool path.

The other basic component of the robotic architecture is the kinematic model. This is a mathematical representation of the links and joints of the physical machine. This can be derived from the final mechanical structure of the primary arm and calibrated to ensure correlation to the real machine. This allows desired and actual joint positions to be combined to calculate an end effector position in space. This is done by creating the mathematical model of the machine and then developing multiple equations to solve for multiple unknowns. Due to the way that robots are constructed, there are typically multiple different possible poses or positions of the joints that can provide a given solution. In order to prevent this and to help the software always achieve a desired pose, the present system is designed to be consistent. This provides a framework for simulation and collision detection that can be used to fully vet and simulate construction programs prior to executing them on the real-life hardware.

The highest-level component is an extension of the path planning module currently used with the robotic system. This leverages a kinematic model to provide full collision detection, simulation, and planning functionality for the semi-constrained trajectories commonly found in AM. Advanced features are possible at this level, such as strategies for improving smoothness and accuracy of motion, collision avoidance, and process-specific tuning.

Figure 9:
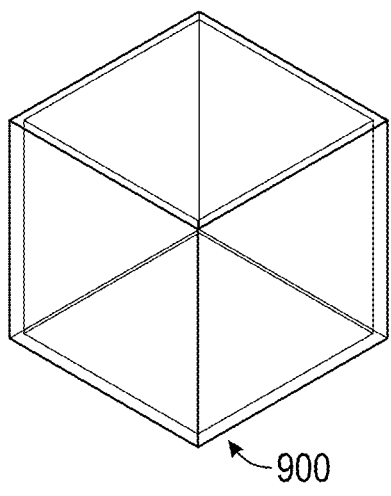
FIG. 9 illustrates an example of hollow form tank.
Figure 10:
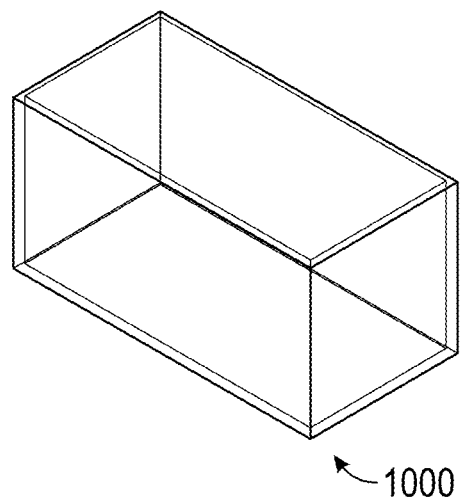
FIG. 10 illustrates an example of hollow form tank.
Figure 11:
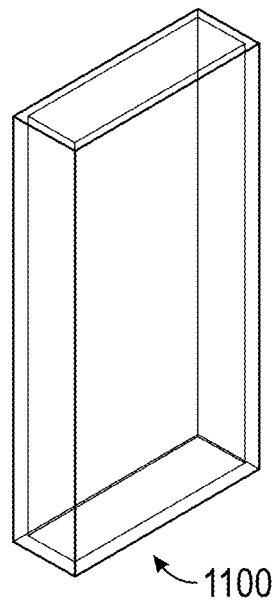
FIG. 11 illustrates an example of hollow form wall piece that can be backfilled with material.
Figure 12:
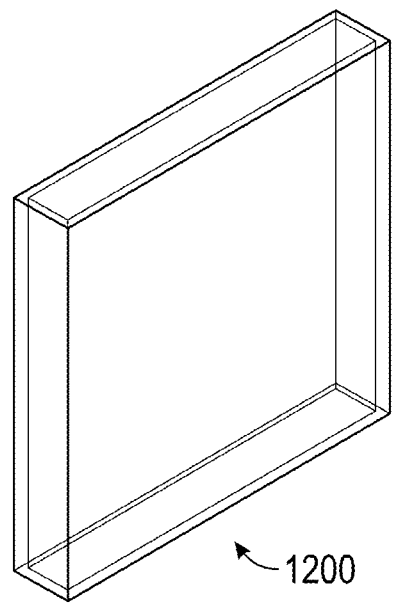
FIG. 12 illustrates an example of hollow form wall piece that can be backfilled with material.

The device can implement intuitive, user-friendly software/interface to support the development of ad hoc construction projects by using a construction library. The incorporated library of objects can have the toolpath precalculated and defined. All the objects can be designed, programmed, and tested so that they simply require the selection of the object on the interface screen and then placement of the object in the planned workspace. Some of the objects are illustrated in FIGS. 9, 10, 11, and 12. FIG. 9 illustrates an example of hollow form tank 900. FIG. 10 illustrates an example of hollow form tank 1000 having a different shape from FIG. 9. FIG. 11 illustrates an example of hollow form wall piece 1100 that can be backfilled with material. FIG. 12 illustrates an example of hollow form wall piece 1200 of a different shape from FIG. 11 that can be backfilled with material. In constructing the building, these shapes can be used to build the building or other structure. Implementation of known shapes allows for a library of shapes to be implemented rather than programing specific structures each time a portion of a building is required.

The use of a library of objects that can be printed as designed or have specifications that can be modified—length, height, etc. can enable a block like method of construction where basic designs can be constructed from the independent shapes in the build library.

This digital construction library and robotic control are combined into a fully integrated software control application for robotic platform. This application gives the operator full intuitive control of the machine with explanation of current build status as well as the status of the full process and material delivery system. This reduces the manpower requirements for the machine so that only one operator is required to observe and operate the machine while another operator can ensure material is available as necessary for the process.

Figure 13:
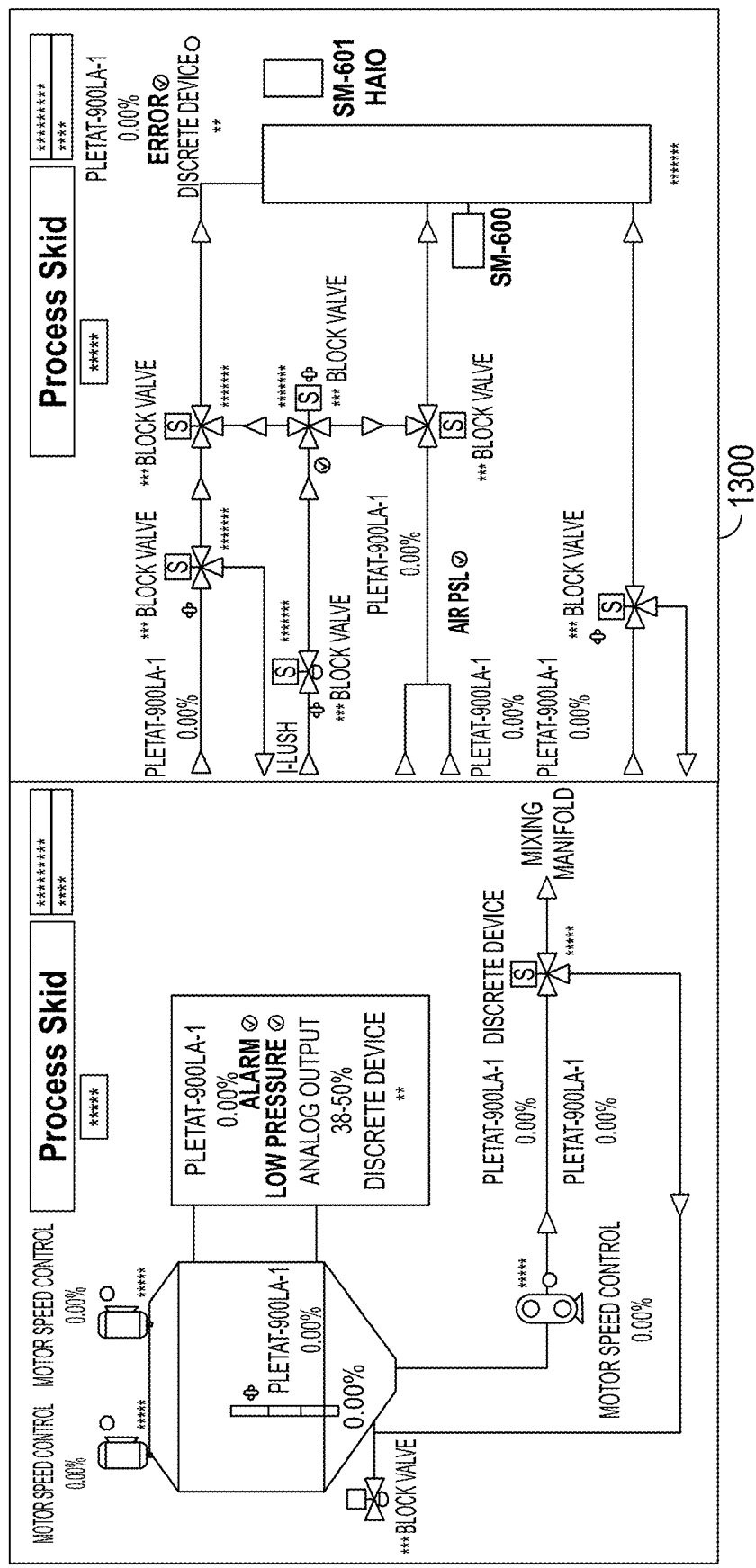
FIG. 13 illustrates examples of material handling operator screens according to the present disclosure.

Additionally, the device can allow for material handling operator screens 1300 to be displayed such as the ones illustrated in FIG. 13. As illustrated in FIG. 14, the application can be loaded and presented to the operator on a handheld pendant 1400 that is safety rated for the control of robotics. This allows the operator to select programs, monitor the current state of the build, as well as manually control and maneuver the robotic platform into location from a safe distance. The handheld pendant 1400 is illustrated to be connected via a wire. In other examples, the handheld pendant 1400 can be coupled wirelessly.

These structures can be backfilled with concrete, high-density polymer, or indigenous materials to create a composite wall system while using little material that must be transported onto the worksite. The material delivery system can have required pressures and flow rates.

Figure 15:
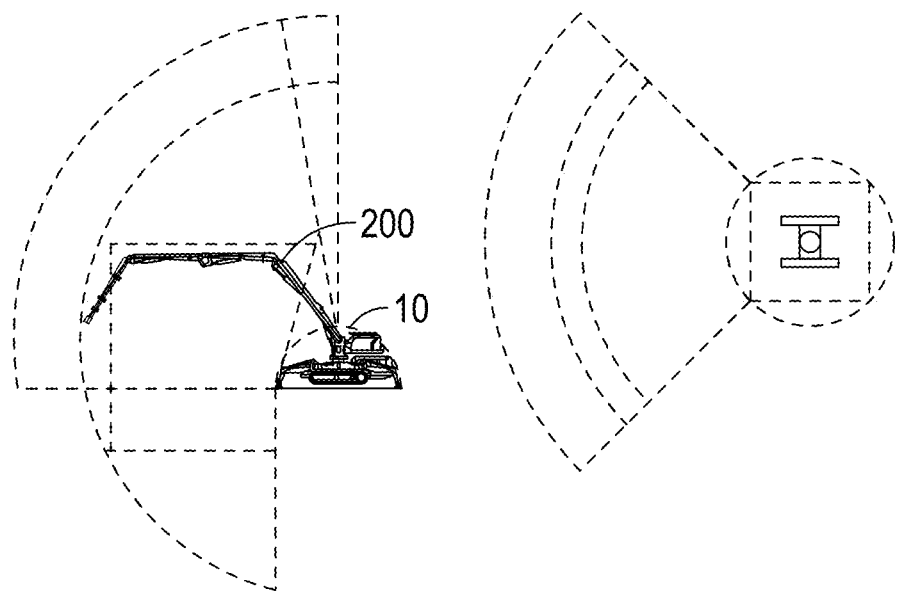
FIG. 15 illustrates an example of a system and associated reaching capability according to the present disclosure.

FIG. 15 illustrates an example of the reach the control arm 200 of the present system 10. As illustrated, the present system 10 can be configured to have different reaches based on the manipulation of the joints of the control arm 200. In at least one example, the system 10 can allow the control arm 200 to reach below grade.

Figure 16:
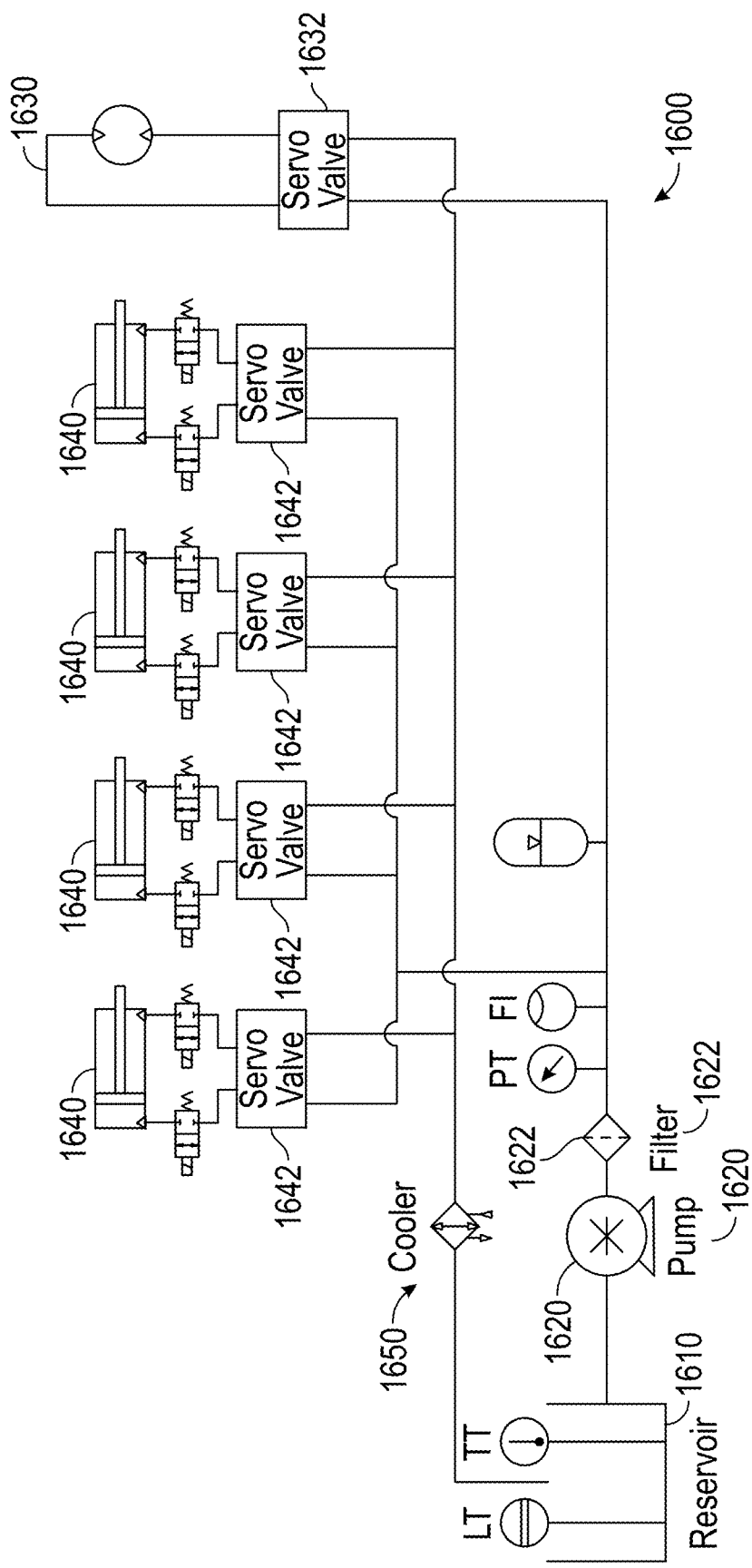
FIG. 16 illustrates an example of control over the hydraulic joints according to the present disclosure.

FIG. 16 is a schematic of a hydraulic system 1600 according to the present disclosure. The hydraulic system can include a fluid reservoir 1610. The fluid reservoir 1610 can be coupled to a pump 1620. A filter 1622 can be provided either between the fluid reservoir 1610 and the pump 1620 or following the pump 1620. Additionally, a slewing ring 1630 can be coupled to the fluid reservoir 1610. A slewing ring servo valve 1632 can control the slewing ring 1630. Additionally, one or more actuators 1640 can be included. The one or more actuators 1640 can be controlled by a valve 1642. As illustrated the valve 1642 can be a servo valve 1642 so that the position of the valve 1642 can be obtained. Additionally, the hydraulic system 1600 can include other system instrumentation to implement control as described herein. For example, the sensors included can be a pressure transducer, flow indicator, temperature transmitter, and/or level transmitter. Additionally a cooler 1650 can be included to keep the temperature of the hydraulic fluid within operating parameters.

Figure 17:
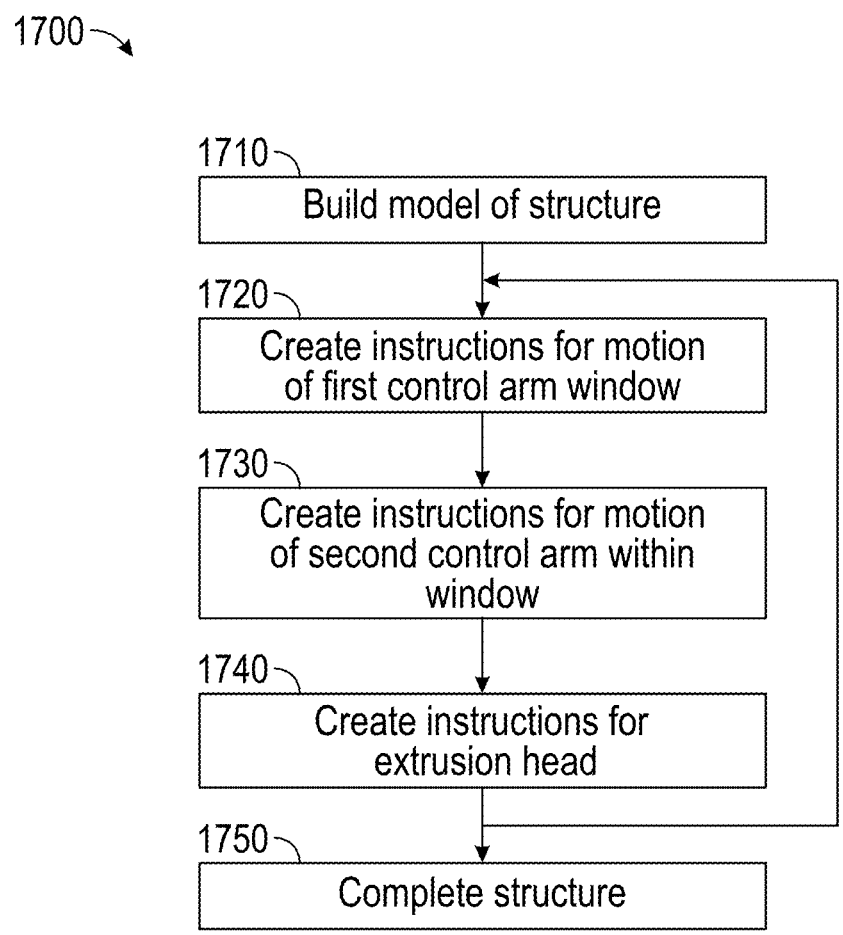
FIG. 17 illustrates an example of a method according to the present disclosure.

FIG. 17 is a flowchart illustrating an example process 1700 for building a structure according to the present disclosure. For the sake of clarity, the process 1700 is described in terms of the system 10, as shown in FIG. 1, configured to perform the process 1700. The steps outlined herein are exemplary and can be implemented in any combination thereof, including combinations that exclude, add, or modify certain steps.

At block 1710, the system can build a model of the structure. The model of the structure can be built using the predefined building blocks such as those illustrated in FIGS. 9, 11, and 12. The structure being built can take a variety of shapes as desired by the operator.

At block 1720, the system 10 can create instructions for motion of the first control arm window. The motion of the first control arm window is such that the control arm is adjusted to allow for the second control arm to move the extrusion head to the desired location based on the structure being built. The window allows the distal end of first control arm to move within the window without adjusting the first control arm. This allows the precision of the first control arm to be more varied.

At block 1730, the system 10 can create instructions for motion of the second control arm from within the window of the distal end of the first control arm. This allows for the motion of the distal end of the second control arm to be both precise and accurate at the same time. The sensing can implement a feedback routine.

At block 1740, the system can create instructions for the extrusion head whereby material exits the extrusion head to form the structure. This process can be continuous loop until the process arrives at block 1750 in which the system determines that a complete structure is generated.

The present disclosure also includes providing alarms to an operator if the distal end of the first control arm is outside of the window. The system can correct the first control arm to account for a variety of external conditions such as wind, oscillations and/or vibrations. Once the distal end of the first control arm is back within the window, the alarm can be canceled. Likewise, a second alarm can be triggered if the distal end of the second control arm is outside of its operating parameters. Additionally, the extrusion head can generate an alarm if the material stops flowing.

Figure 18:
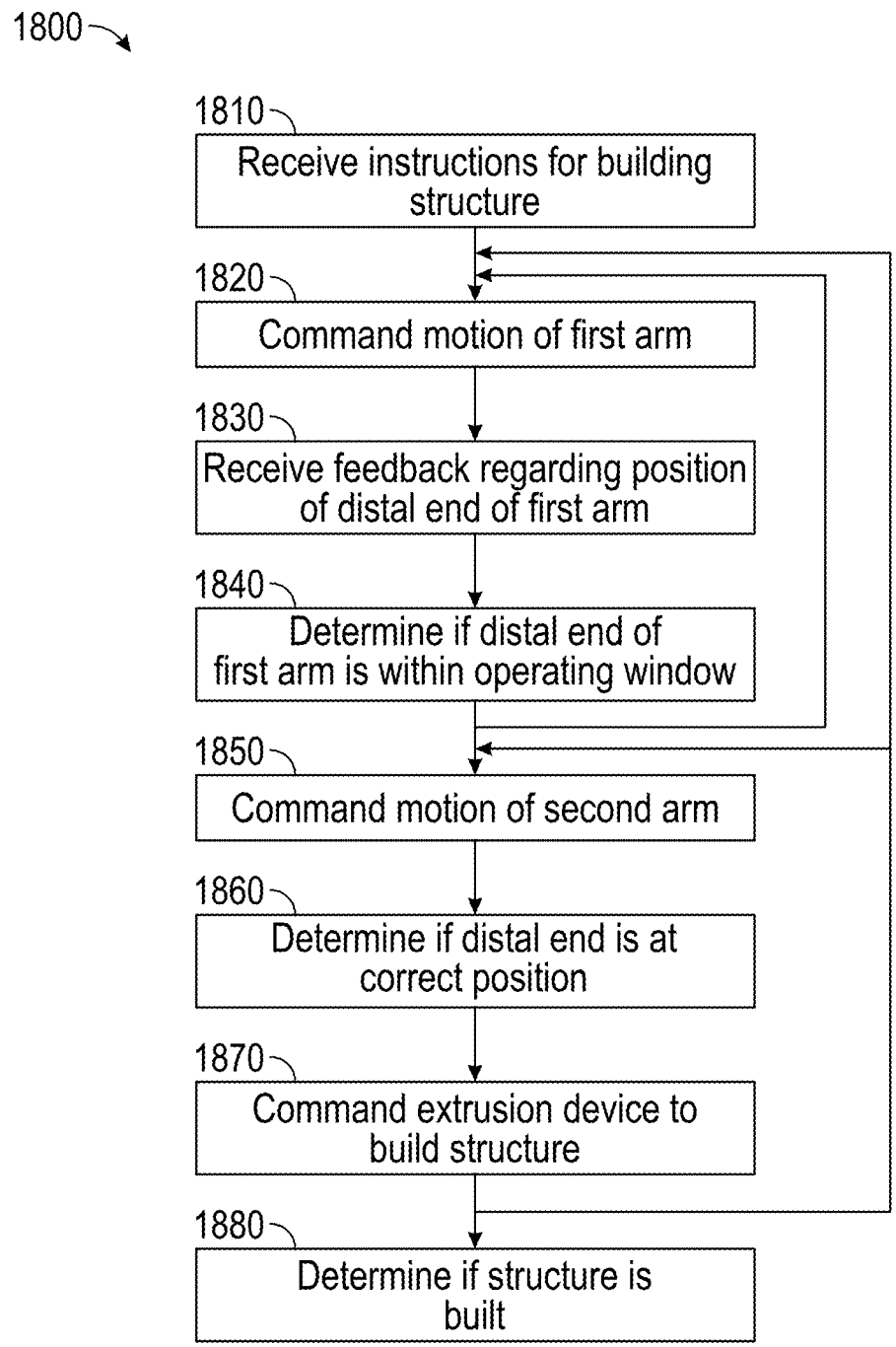
FIG. 18 illustrates an example of a method according to the present disclosure.

FIG. 18 is a flowchart illustrating an example process 1800 for building a structure according to the present disclosure. For the sake of clarity, the process 1800 is described in terms of the system 10, as shown in FIG. 1, configured to perform the process 1800. The steps outlined herein are exemplary and can be implemented in any combination thereof, including combinations that exclude, add, or modify certain steps.

At block 1810, the system 10 can receive instructions for building a structure. In one example, the instructions can be based on the predefined building blocks such as those illustrated in FIGS. 9, 10, 11, and 12. The structure being built can take a variety of shapes as desired by the operator. In other examples, the instructions can be detailed instructions for the motion of the extrusion head. With the instructions for the motion of the extrusion head, the system can generate instructions for motion of the first arm, the second arm, and extrusion head.

At block 1820, the system 10 can command motion of the first arm. The motion of the first arm can be such that the motion of the first arm results in a distal end of the first arm being within a window as described herein.

At block 1830, the system 10 can receive feedback regarding a position of the distal end of the first arm. The feedback can be based on the hydraulic cylinder data as described herein. Additionally, the present disclosure can implement inertial sensors to track positioning of the first arm and provide feedback of the motion generated.

At block 1840, the system 10 can determine if the distal end of the first arm is within the operating window. If the determination fails, then the system can repeat blocks 1820, 1830, and 1840 until a positive determination is made. In other examples, the system 10 can continuously monitor the distal end of the first arm to determine if it is within the operating window and make adjustments based thereon regardless of the other steps occurring.

At block 1850, the system 10 can command motion of the second arm. The motion of the second arm can be based upon the location of the distal end of the first arm. In other examples, the accuracy of the location of the distal end of the second arm can be determined independently from the distal end of the first arm.

At block 1860, the system 10 can determine if the distal end is at the correct position. The determination can be made using feedback received from one or more sensors as described herein including one or more of the joints and/or positional sensors.

At block 1870, the system 10 can command the extrusion head to build a structure. The system 10 can monitor the structure and adjust the distal end of the first arm and/or distal end of the second arm respectively.

At block 1880, the system 10 can determine if the structure is built.

The present disclosure also includes providing alarms to an operator if the distal end of the first control arm is outside of the window. The system can correct the first control arm to account for a variety of external conditions such as wind, oscillations and/or vibrations. Once the distal end of the first control arm is back within the window, the alarm can be canceled. Likewise, a second alarm can be triggered if the distal end of the second control arm is outside of its operating parameters. Additionally, the extrusion head can generate an alarm if the material stops flowing.

In some examples, the processes described herein (e.g. processes 1700, 1800 and/or any other process described herein) may be performed by a computing device or apparatus. In one example, the process can be performed by the computing system having the computing device architecture 700 shown in FIG. 19. For instance, a computing device with the computing device architecture 700 shown in FIG. 7 can implement the operations of FIG. 17 or FIG. 18 and/or the components and/or operations described herein with respect to any of the preceding FIGS.

The computing device can include any suitable device, such as a server computer, a mobile device (e.g., a mobile phone), a desktop computing device, a tablet computing device, a laptop computer, and/or any other computing device with the resource capabilities to perform the processes described herein, including the processes 1700, 1800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 1700 and 1800 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1700 and 1800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 19:
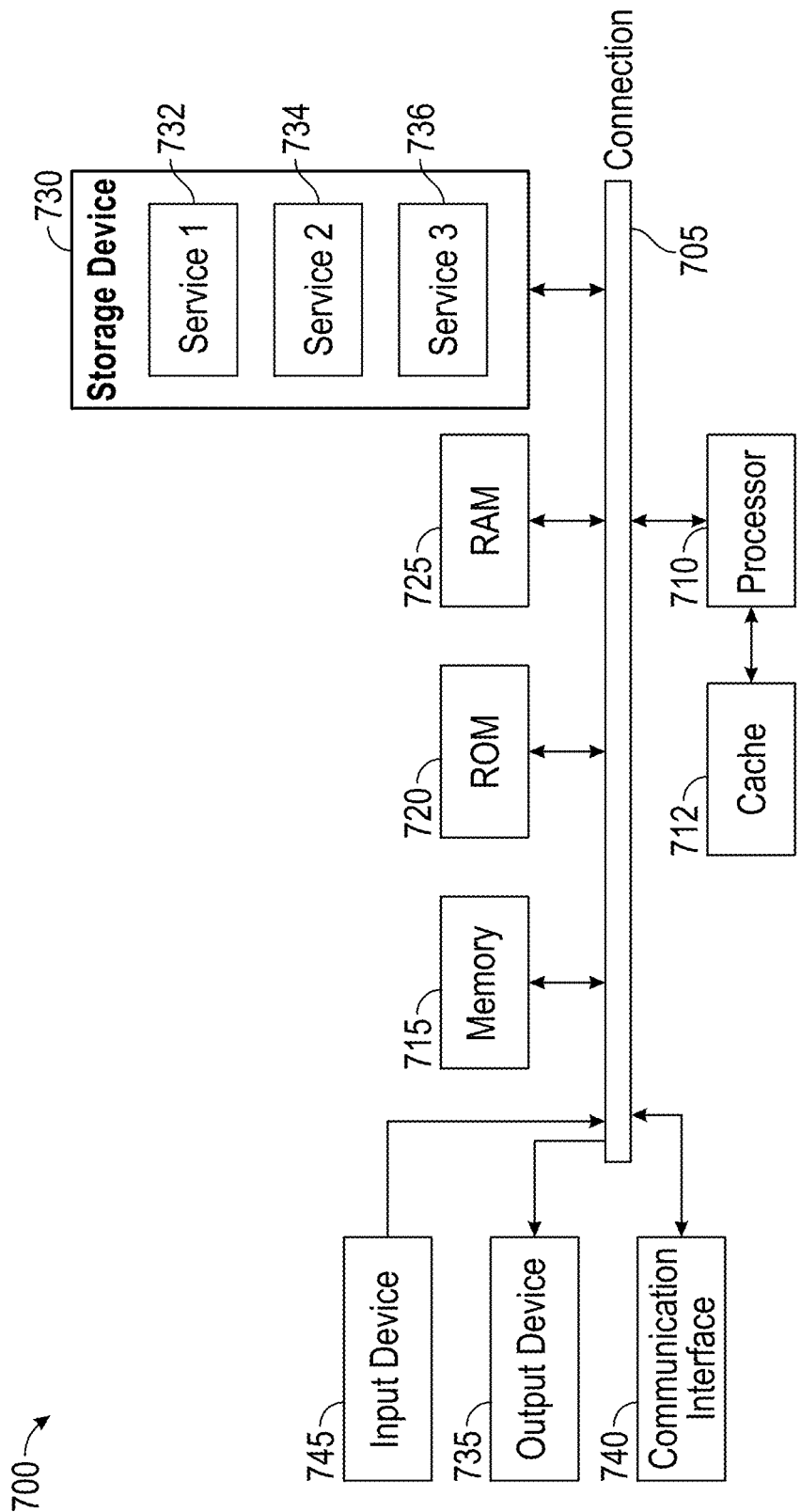
FIG. 19 is a diagram illustrating an example system architecture for implementing certain aspects described herein.

FIG. 19 illustrates an example computing device architecture 700 of an example computing device which can implement various techniques described herein. For example, the computing device architecture 700 can implement at least some portions of the route generation system 100 shown in FIG. 1. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service (e.g., service 1 732, service 2 734, and service 3 736) stored in storage device 730 and configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include service 732, service 734, and service 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A system for constructing a building comprising: a controller including a memory and one or more processors; a first control arm including one or more hydraulic joints, the one or more hydraulic joints operable to receive instructions from the controller, wherein a proximal end of the first control arm is coupled to a base unit and a distal end extends away from the proximal end, and the one or more hydraulic joints are located between the proximal and distal end; a second control arm coupled to the distal end of the first control arm, wherein the first control arm has a reach that is at least two times greater than the second control arm; an extrusion head located on the distal end of the second control arm, the extrusion head operable to extrude material to form a building; wherein the controller is operable to adjust the first control arm to hold the distal end steady within a predetermined window of coordinates, and the controller is operable to position the second control arm such that the extrusion head is located according to the controller directions.

Aspect 2: The system of Aspect 1, wherein the reach of the first control arm is at least ten times greater than the second control arm.

Aspect 3: The system of Aspect 1, wherein the reach of the first control arm is at least five times greater than the second control arm.

Aspect 4: The system of Aspect 1, wherein the reach of the first control arm is at least three times greater than the second control arm.

Aspect 5: The system of any of Aspects 1 to 4, wherein the one or more hydraulic joints includes a positional feedback system that provides data to the controller.

Aspect 6: The system of Aspect 5, wherein the first control arm includes at least three hydraulic joints having an associated hydraulic cylinder, wherein the hydraulic cylinder contains the positional feedback system.

Aspect 7: The system of Aspect 6, further comprising inertial feedback sensors located along the first control arm, wherein the inertial feedback sensors provide data to the controller and the controller compares the data from the inertial feedback sensors with the data received from the hydraulic cylinders.

Aspect 8: The system of Aspect 7, wherein the controller determines if the distal end of the first control arm is within a window that is defined by operational reach of the second control arm, whereby the print head is adjusted by the second control arm to be at the desired location.

Aspect 9: The system of Aspect 8, wherein the window is a predetermined shape based on the degrees of freedom of the second control arm.

Aspect 10: The system of Aspect claim 9, wherein the window extends greater in one direction as compared to another direction.

What is claimed is:

1. A system for constructing a building comprising:
   a controller including a memory and one or more processors;
   a first control arm including a hydraulic joint, a proximal end and a distal end, the hydraulic joint operable to receive instructions from the controller, the proximal end of the first control arm being coupled to a base unit, and the hydraulic joint being located between the proximal and the distal end;
   a position feedback sensor that provides data to the controller regarding a position of the hydraulic joint;
   an inertial feedback sensor located on the first control arm, wherein the inertial feedback sensor provides data to the controller;
   a second control arm coupled to the distal end of the first control arm; and
   an extrusion head attached to a distal end of the second control arm, the extrusion head operable to extrude material to form a structure;
   wherein the controller is operable to adjust the first control arm to position the distal end of the first control arm within a predetermined window of coordinates, and the controller is operable to position the second control arm such that the extrusion head is located according to directions from the controller;

wherein the controller determines if the distal end of the first control arm is within a window that is defined by operational reach of the second control arm, whereby a print head is adjusted by the second control arm to be at a desired location;

wherein the window is a predetermined shape based on degrees of freedom of the second control arm; and wherein the window extends greater in one direction as compared to another direction.

2. The system as recited in claim 1, wherein the position feedback sensor is mounted to the hydraulic joint.

3. The system as recited in claim 1, wherein the controller compares the data from the inertial feedback sensor with the data received from the position feedback sensor.

4. The system as recited in claim 1, further including a container for holding a material to be delivered to the extrusion head, the container being in communication with the extrusion head.

5. The system as recited in claim 1, further including a container for holding a material to be delivered to the extrusion head, the container being in communication with the extrusion head.

6. A system for constructing a building comprising:
a controller including a memory and one or more processors;
a first control arm including a hydraulic joint, a proximal end and a distal end, the hydraulic joint operable to receive instructions from the controller, the proximal end of the first control arm being coupled to a base unit, and the hydraulic joint being located between the proximal and the distal end;
a position feedback sensor mounted to the hydraulic joint and that provides data to the controller regarding a position of the hydraulic joint;
an inertial feedback sensor located on the first control arm, wherein the inertial feedback sensor provides data to the controller;
a second control arm coupled to the distal end of the first control arm; and
an extrusion head attached to a distal end of the second control arm, the extrusion head operable to extrude material to form a structure;
wherein the controller uses data from the position feedback sensor and the inertial feedback sensor to control movement of the extrusion head;
wherein the controller determines if the distal end of the first control arm is within a target window;
wherein the window is a predetermined shape based on degrees of freedom of the second control arm; and
wherein the window extends greater in one direction as compared to another direction.

7. The system as recited in claim 6, wherein the controller compares the data from the inertial feedback sensor with the data received from the position feedback sensor.

* * * * *